United States Patent [19]
Johnston

[11] 3,811,530
[45] May 21, 1974

[54] SOIL-COMPACTION METHOD AND APPARATUS FOR A SEISMIC ENERGY SOURCE TRANSDUCER

[75] Inventor: Otis A. Johnston, League City, Tex.

[73] Assignee: Western Geophysical Company of America, Houston, Tex.

[22] Filed: May 5, 1971

[21] Appl. No.: 140,389

[52] U.S. Cl. .......... 181/.5 VM
[51] Int. Cl. .......... G01v 1/14
[58] Field of Search .......... 181/.5 VM, .5 EC

[56] References Cited
UNITED STATES PATENTS 3,283,846 11/1966 Lindall et al. .......... 181/0.5 VM
3,550,719 12/1970 Meister .......... 181/0.5 VM

*Primary Examiner*—Richard A. Farley
*Assistant Examiner*—T. M. Blum
*Attorney, Agent, or Firm*—Michael P. Breston

[57] ABSTRACT

A hydraulic lifting mechanism is provided to lift and lower a seismic transducer relative to the bed of a carrier. After the transducer couples with the ground, a portion of the carrier is raised above ground to apply a predetermined static load to the transducer. Maximum static loading is accomplished by using the lift mechanism to raise one end of the carrier just clear off the ground, regardless of local surface relief. An incremental lift is then automatically added to compensate for soil compaction.

1 Claim, 3 Drawing Figures

2
30
80
1
35
40
33
34
43
32
36
42
38
37
31
41
2

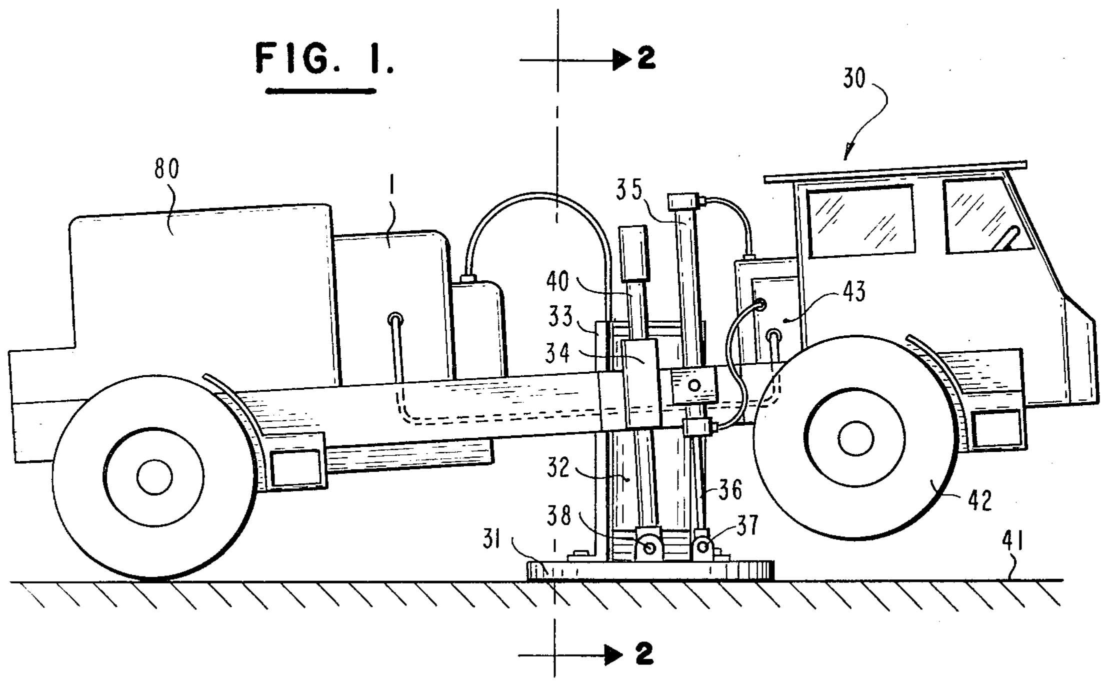
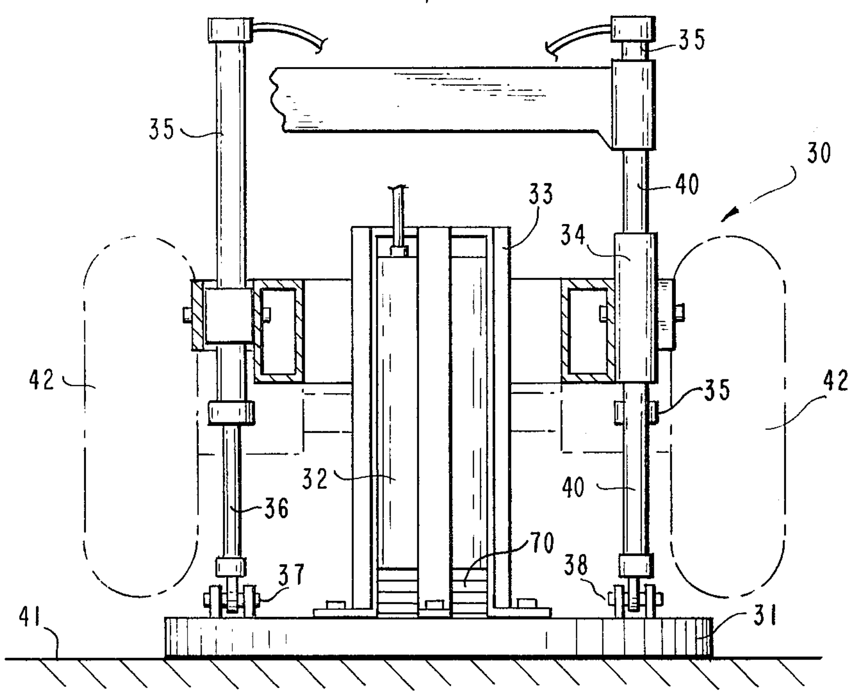
FIG. 2.
INVENTOR.
Otis A. Johnston,
BY
MICHAEL P. BRESTON
ATTORNEY.

INVENTOR.
Otis A. Johnston,
BY
MICHAEL P. BRESTON
ATTORNEY.

SOIL-COMPACTION METHOD AND APPARATUS FOR A SEISMIC ENERGY SOURCE TRANSDUCER

BACKGROUND OF THE INVENTION

In modern seismic exploration, it has become common practice to employ a vibrator transducer to impart to the ground an oscillatory sweep-signal of predetermined characteristics. Generally the vibrator transducer includes a base plate in contact with the ground, a reaction mass having a weight of a ton or more, and a linear actuator designed to move the reaction mass reciprocatingly relative to the base plate in short vertical strokes. Working against the reaction mass, the base plate injects the desired vibrations into the ground. For brevity, hereafter in this application, the term "base plate" shall be taken to include the entire vibrator transducer assembly.

In operation, a first seismic station is occupied and a suitable oscillatory sweep-signal is injected into the ground for several seconds. The base plate is then retracted, moved to a new station a few feet away, the plate is lowered, and a signal is again injected into the ground. Typically the entire cycle of base-plate retraction, transportation, re-emplacement, and preparation for a new sweep signal must be completed approximately within a 4.5 second duty cycle.

For transportation from place to place, the transducer assembly is suspended from the bed of a suitable carrier just forward of its center of gravity. Generally the carrier is a wheeled vehicle, but a carrier with flexible tracks can also be used. Hydraulic lift means are provided to retract the base plate for transportation or to extend it to the ground for generating seismic signals.

To achieve firm coupling with the ground and to prevent signal distortion, it is essential to apply a large static mass to the base plate. Using the hydraulic lift, a portion of the weight of the carrier is applied against the base plate by raising one end of the carrier from ground.

The vibrator requires a large quantity of hydraulic power for its operation. To keep the physical dimensions of the hydraulic system within tolerable limits, sufficient power is stored by the hydraulic pump in the accumulators to drive the actuators but with little reserve hydraulic power remaining for ancillary functions.

Static loading is applied to the base plate by means of the hydraulic lift mechanism until an instant prior to the initiation of a new sweep signal. If an excessive amount of hydraulic power is drawn by the hydraulic lift, insufficient power remaines for operating the vibrator since the hydraulic pump does not have time to recharge the high-pressure accumulators. Therefore, it is essential to conserve the reserve of hydraulic power during the 4.5 second duty cycle of base plate retraction, transportation, and re-emplacement in preparation for each new sweep-signal generation.

In the prior art, the carrier was lifted by an arbitrary amount equal to some fixed fraction of the total stroke-length of the base-plate lifting means. Typically, after this fixed amount of lift had been achieved, a mechanical switch was opened to cut off further inflow of fluid to the hydraulic lift.

This prior art method is very inefficient from a standpoint of hydraulic power utilization even on level terrain which, in field operation, is the exception rather than the rule.

For example, if the base plate is lowered into a depression relative to the wheels of the carrier, the use of a fixed-stroke lift does not necessarily raise the carrier high enough from the ground to apply the required static load. On the other hand, if the base plate is to be lowered onto a mound relative to the wheels of the carrier, use of a fixed-stroke lift would raise the carrier needlessly high and would be wasteful of hydraulic power needed for operating the linear actuator of the vibrator assembly.

SUMMARY OF THE INVENTION

A hydraulic lift assembly is provided which ensures the application of maximum available static loading to the base plate of a seismic energy source transducer under all ground level conditions. As one end of the carrier is raised, maximum static loading occurs at the instant when all the weight of the lifted end is transferred to the base plate. Any further lifting only results in less loading being applied to the base plate and is wasteful of hydraulic power.

During an operating cycle, a vibrating sweep signal is applied to the base plate. The vibrating base plate compacts the underlying soil. Compensation for ground compaction is made by lifting the carrier an incremental height beyond the height of maximum base plate loading.

The carrier is lifted by the hydraulic lift assembly which receives hydraulic fluid under pressure. A pressure switch measures the applied pressure during lifting of the carrier. When maximum pressure rise is sensed, the pressure switch opens and causes a control valve to close. The control valve closes slowly to allow the incremental lift to take place after the pressure switch opens.

Accordingly, it is an object of this invention to provide a means for automatically supplying maximum static loading to a seismic energy source transducer.

It is another object of this invention to provide a hydraulic transducer lifting device which is economical of hydraulic power.

It is a further object of this invention to provide an automatic adjustment to compensate for the settlement of the transducer due to soil compaction.

BRIEF DESCRIPTION OF THE DRAWINGS

FIG. 1 shows a carrier means with two wheels raised from the ground to apply a static load to a seismic energy source transducer;

FIG. 2 is a sectional view on line 2—2 in FIG. 1; and

Figure 3:
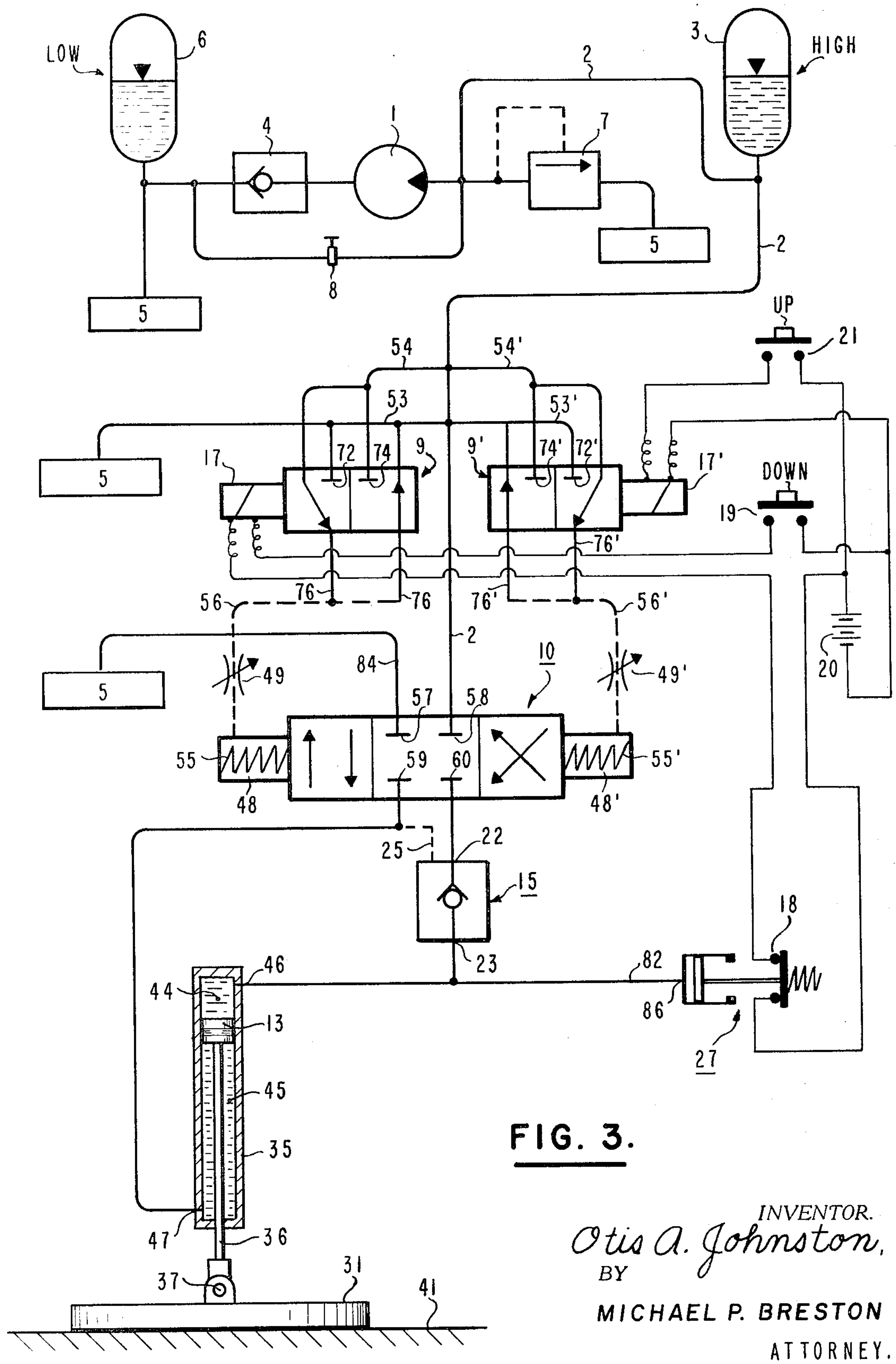
FIG. 3 is a diagrammatic hydraulic control circuit used for the lifting mechanism of a preferred embodiment of this invention.

In the drawings there is shown a carrier, generally indicated as 30, for transporting an energy source which may consist of a base plate 31, a reaction mass 32, and a linear actuator 33, all hereinafter referred to generally as the base plate assembly. Reaction mass 32 is acoustically isolated from base plate 31 by suitable low-frequency spring means 70. Linear actuator 33 is secured to base plate 31. Fastened to the bed of carrier 30 is a double-acting hydraulic lift cylinder 35 whose piston rod 36 is connected to the base plate assembly by means of a flexible hinge joint 37. Rod 36 raises or lowers the plate assembly under hydraulic power applied respectively to the lower or upper chambers of cylinder 35. Fixedly attached to the frame of carrier 30 is a guide cylinder 34 whose guide rod 40 is connected to the base plate assembly by means of flexible hinge joints 38. Rod 40 moves slidably within guide cylinder 34 thereby constraining the base plate assembly to move smoothly in a vertical direction relative to the bed of the carrier. Use of hinge joints to connect piston rods 36 and guide rods 40, permits base plate assembly 31 to rest flat even on a ground surface which slopes with respect to the bed of the carrier.

Application of hydraulic power from the hydraulic control system, shown generally as 43, to the upper chamber of cylinder 35 forces the base plate assembly to contact the earth's surface 41. Still further application of hydraulic power lifts front wheels 42 upwards from ground to apply the requisite static load to the base plate assembly 31.

FIG. 3 illustrates the details of a hydraulic control system 43 used to actuate the base plate lift mechanism. It is to be understood that other devices are connected to the hydraulic system 43, such as the linear actuator 33, but these devices are not shown in FIG. 3 for reasons of clarity.

Also, as shown in FIG. 2, there are two hydraulic base plate lift cylinders on carrier 30, but in FIG. 3 only one such cylinder is shown to simplify the drawing. In actual practice both lift cylinders are connected in parallel.

Hydraulic power is generated by a pump 1 (FIGS. 1 and 3). Pump 1 is driven by a suitable prime mover 80. Hydraulic fluid is pumped at high pressure, say 3,000 psi, into a high-pressure line 2 and a high-pressure accumulator 3 which contains a nitrogen-filled bladder pressurized to 1,500 psi. Accumulator 3 maintains substantially constant pressure on the hydraulic lines, regardless of surges due to intermittent application of power to the various hydraulically operated devices. Check valve 4 prevents high-pressure fluid from flowing into a low-pressure sump 5. A low-pressure accumulator 6 is connected to sump 5. Accumulator 6 contains a nitrogen-filled bladder inflated to 100 psi to prevent cavitation at the pump. A relief valve 7 is set to the operating pressure plus 500 pounds. Manually operated bypass valve 8 is used to equalize pressure in all parts of the system when the system is shut down.

Connected to high pressure line 2 and low-pressure return line 53 are solenoid-operated pilot valves 9 and 9′, choke valves 49, 49′ and a four-way spool valve 10 all being types well known to the art. Solenoid-operated pilot valves 9 and 9′ have two inlet ports 72 and 74 and one outlet port 76.

Inlet ports 72 and 72′ are connected to low-pressure return line 53. Inlet ports 74 and 74′ are connected to high pressure line 54. Outlet ports 76 and 76′ are connected, respectively, to pilot lines 56 and 56′. When a solenoid 17 or 17′ is de-energized, outlet port 76 or 76′ will normally communicate with inlet ports 72 and 72′ which are connected to return line 53. When solenoid 17 or 17′ is energized by means of a push button 19 or 21, outlet port 76 or 76′ will communicate with inlet port 74 or 74′, both connected to high pressure lines 54.

Power to energize solenoids 17 and 17′ is supplied by battery 20. Energization of the solenoids is accomplished by pressing push button 19 or 21. In series with push button 19 is a pressure switch 27 having contacts 18. Pressure switch 27 is normally in its closed position when no pressure exists in line 82.

Four-way spool valve 10 is of a type well known to the art. Spool valve 10 has a return port 57, pressure port 58, and outlet ports 59 and 60. Return port 57 is connected to low-pressure return line 84 leading to low pressure sump 5. Pressure port 58 is connected to high pressure line 2. Spool valve 10 also has two outlet ports 59 and 60 whose use will be hereinafter described. Spool valve 10 contains a slidable spool member, not shown, which is normally centered by centering springs 55, 55′ when no pressure exists in pilot ports 48, 48′. When spool valve 10 is in the neutral position all ports are blocked. Spool valve 10 is opened in one direction by feeding high pressure fluid from pilot valve 9 through pilot line 56 and choke valve 49 into pilot port 48. Application of the pressurized fluid in pilot port 48 forces the valve spool to move against the pressure of an opposite centering spring 55′. When this is done, ports 57 and 58 are interconnected respectively with outlet ports 59 and 60.

When pilot valve 9′ is actuated, high pressure hydraulic fluid passes through pilot line 56′, through choke valve 49′ and into pilot port 48′. Application of high pressure to pilot port 48′ forces the spool piece to move in the opposite direction against the pressure of centering spring 55. This action opens return port 57 to port 60 and pressure port 58 to port 59.

Choke valves 49 and 49′ control the rate at which hydraulic fluid is applied to or exhausted from pilot ports 48 or 48′, and hence these valves control the speed at which the spool valve 10 opens or closes.

In operation, solenoid 17 is energized by holding push button 19 closed. Actuation of solenoid 17 opens high pressure port 74 to outlet 76. High pressure hydraulic fluid flows through pilot line 56, through choke valve 49, and into pilot port 48. At this time, pilot valve 9′ is not energized and thus pilot line 56 is open to return line 53. Since pilot line 56′ is open to return line 53′, excess hydraulic fluid accumulating in pilot port 48′, by reason of the movement of the spool piece against spring 55′, drains back into low pressure sump 5. When pilot valve 9 is de-energized, pilot line 56 is then open to return line 53. Similarly since pilot valve 9′ is also de-energized, pilot line 56′ is open to return line 53′. Pressure in both pilot ports 48 and 48′ will therefore be equalized so that spool valve 10 can return to the closed, neutral position under the action of centering springs 55 and 55′. The rate at which spool valve closes is governed by the setting of choke valve 49. Adjustment of choke valve 49 thus provides a means for introducing a predetermined time delay in the closing of valve 10, following de-energization of relay 17. It is apparent that a similar action occurs when pilot valve 9′ is energized and de-energized.

Outlet port 60 of spool valve 10 is connected to inlet port 22 of pilot check valve 15, and high-pressure hydraulic fluid flows out through outlet port 23 into line 82. When solenoid operated pilot valve 9 is energized, spool valve 10 is open; high pressure hydraulic fluid flows from inlet port 58 to outlet port 60 and through check valve 15 to line 82 without hindrance. Pilot line 25 of pilot check valve 15 is connected to low pressure return line 84 by way of inlet ports 57 and outlet port 59 of spool valve 10. So long as the pressure in pilot line 25 is less than one-fourth the pressure in high pressure line 82, pilot check valve 15 will remain closed to prevent reverse flow of hydraulic fluid from outlet port 23 backwardly through inlet port 22.

Now let pilot valve 9 be de-energized and pilot valve 9' be energized. High pressure line 2 is connected to pilot line 25 of pilot check valve 15 by way of ports 58 and 59 of spool valve 10. Since now the pressure applied to pilot line 25 exceeds one-fourth the pressure in pressure line 82, the ball of pilot check valve 15 is forced from its seat so that the high pressure fluid in line 82 now returns to low-pressure return line 84 by way of ports 60 and 57 of spool valve 10.

Line 82 is connected to inlet port 86 of pressure valve 27. So long as the pressure in line 82 is less than a pre-determined value, contacts 18 of pressure switch 27 will remain closed.

The hydraulic lift assembly consists of cylinder 35, piston 13 and piston rod 36. Piston rod 36 is fastened to base plate assembly 31 by way of hinge joint 37. Piston 13 divides the interior of cylinder 35 into an upper chamber 44 and a lower chamber 45. Hydraulic fluid is admitted to the upper chamber 44 by way of inlet port 46. Hydraulic fluid is admitted into lower chamber 45 through inlet port 47. Downward motion of piston 13 and piston rod 36 is accomplished by applying high-pressure hydraulic fluid through inlet port 46. Upward motion is accomplished by applying high pressure fluid to lower chamber 45 by way of inlet port 47.

To lower base plate 31 push button 19 is held depressed. Contacts 18 of pressure valve 27 are closed at this point because the pressure in line 82 is below the required actuating pressure. Thus solenoid 17 of pilot valve 9 can be actuated and high-pressure fluid flows from high pressure line 54 through ports 74 and 76 of pilot valve 9, through pilot line 56, choke valve 49 and into pilot chamber 48, thereby opening spool valve 10. High-pressure hydraulic fluid now flows from line 2 through ports 58 and 60 of spool valve 10, through pilot check valve 15 into port 86 of pressure switch 27, and into inlet port 46 of hydraulic cylinder 35, thereby forcing piston rod 36 and plate 31 downwardly. At the same time, excess fluid in lower chamber 45 of cylinder 35 returns to sump 5 through port 47 of cylinder 35, and through ports 59 and 57 of spool valve 10 to return line 84. As the base plate assembly 31 is pushed downwardly against the surface of the earth 41, the carrier means is raised thereby applying a static load to the base plate assembly 31. As the loading is transferred from the front wheels 42 of the carrier 30 to the base plate assembly 31, pressure builds up in pressure line 82. When the pressure reaches a predetermined maximum, contacts 18 of pressure switch 27 open. The opening of contacts 18 of pressure switch 27 de-energizes solenoid 17 of pilot valve 9. Release of pressure on pilot line 56 causes the spool valve 10 to return to neutral under the action of centering spring 55'. The rate at which valve 10 closes is determined by the setting of choke valve 49. Therefore an incremental lift will be imparted to piston rod 36 relative to cylinder 35 during the delay time required for spool valve 10 to close. When spool valve 10 has closed, further flow of hydraulic fluid is shut off. Hydraulic piston 13 will be locked in final position by the action of check valve 15.

When it is desired to retract the base-plate assembly 31, push button 21 is held closed, activating solenoid 17' and applying high pressure hydraulic fluid through pilot line 56', choke valve 49', and pilot port 48'. This action opens pressure port 58 to outlet port 59 of spool valve 10. High pressure hydraulic fluid is now applied to pilot line 25 of pilot check valve 15 and to inlet port 47 of cylinder 35. Application of high-pressure fluid to pilot check valve 15 unseats the ball of check valve 15 and opens outlet port 60 to return port 57. Application of high-pressure hydraulic fluid to lower chamber 45 of cylinder 35 forces piston 13 upwards. At the same time excess hydraulic fluid in upper chamber 44 of cylinder 35 exhausts through pilot check valve 15 and into low pressure return line 84 by way of ports 57 and 60 of spool valve 10.

Although this invention is disclosed with reference to a vibrator type seismic energy source, it is also adaptable to other types of energy sources.

What is claimed is:

1. In a portable seismic energy source apparatus including a transducer having a base plate for use on a land surface in combination with a vehicular mass, a lifting means interconnecting said transducer and said vehicular mass for alternatingly retracting said transducer from and pressing said transducer against said land surface, said lifting means being adapted to lift one end of said vehicular mass from the ground surface to transfer a preselected fraction of the weight of the vehicular mass from said one end thereof to the transducer to thereby apply a static loading to said base plate, a load-sensing means interconnected with said lifting means adapted to disable said lifting means when the preselected fractional vehicular-mass weight has been transferred to said base plate, the improvement including:

a time-delay means interconnected with said load-sensing means to delay disablement of said lifting means until a predetermined incremental lift has been achieved, said incremental lift being determined in accordance with the bearing strength of the soil beneath said base plate.

* * * * *